United States Patent [19]
Leatherman

[11] 3,900,360
[45] Aug. 19, 1975

[54] SELF-HEATING COMPOSITE BONDING MEANS AND METHOD

[75] Inventor: Alfred F. Leatherman, Columbus, Ohio

[73] Assignee: William C. Heller, Jr., Milwaukee, Wis.

[22] Filed: Oct. 20, 1972

[21] Appl. No.: 299,349

[52] U.S. Cl. .............. 156/272; 156/276; 156/309; 156/310; 156/313; 161/84; 161/87; 161/158
[51] Int. Cl. .......................................... B29c 27/04
[58] Field of Search .......... 156/272, 309, 380, 276, 156/291, 313, 327, 73, 182, 298, 300, 306, 309, 310, 499; 161/146, 70, 82, 83, 84, 140, 143, 87, 144, 158; 117/37

[56] References Cited
UNITED STATES PATENTS

| | | | |
|---|---|---|---|
| 3,348,640 | 10/1967 | Thompson et al. | 156/272 |
| 3,528,867 | 9/1970 | Leatherman et al. | 156/380 |
| 3,574,031 | 4/1971 | Heller et al. | 156/272 |
| 3,646,670 | 3/1972 | Maeda et al. | 156/272 |
| 3,649,438 | 3/1972 | Walker et al. | 156/272 |
| 3,687,764 | 8/1972 | Rogosch et al. | 156/309 |
| 3,721,597 | 3/1973 | Colburn | 156/309 |
| 3,734,813 | 5/1973 | Pohl | 156/272 |

Primary Examiner—Charles E. Van Horn
Assistant Examiner—F. Frisenda
Attorney, Agent, or Firm—Andrus, Sceales, Starke & Sawall

[57] ABSTRACT

A self-heating stratified structure suitable for joining first and second thermally bondable bodies exhibiting bonding incompatibility. The structure includes a first layer having bonding compatibility with a first of the bodies, a second material layer having bonding compatibility with a second of the bodies and a fibrous stratum interposed between the first and second layers for providing internal cohesion and integrity to the bonding agent. At least one of the first and second material layers is heatable upon exposure to a selected form of indirectly applied energy such as an alternating magnetic or electric field. In bonding the first and second bodies, the composite bonding agent is positioned between the two bodies and exposed to the energy to effect heat seals between the bodies and the agent and thus between the two bodies.

8 Claims, 7 Drawing Figures

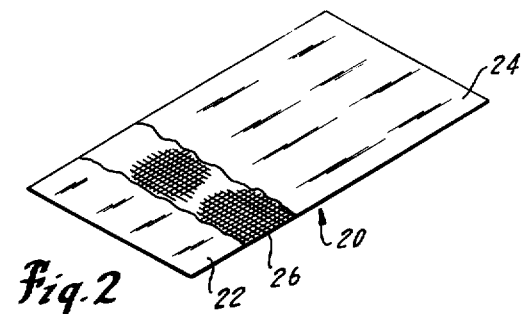
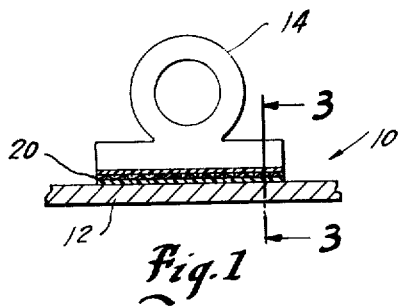
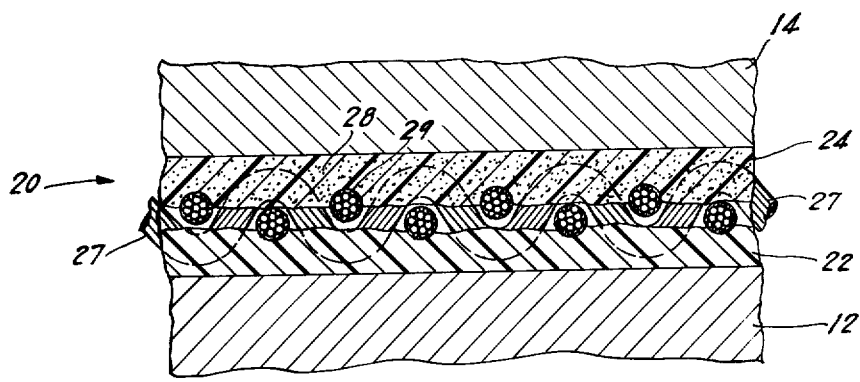
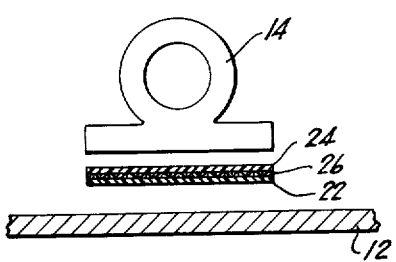
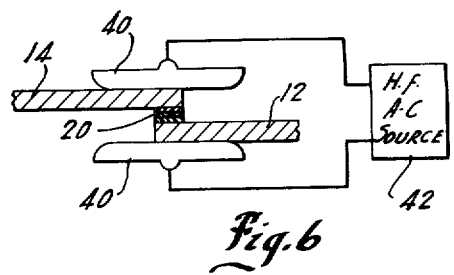
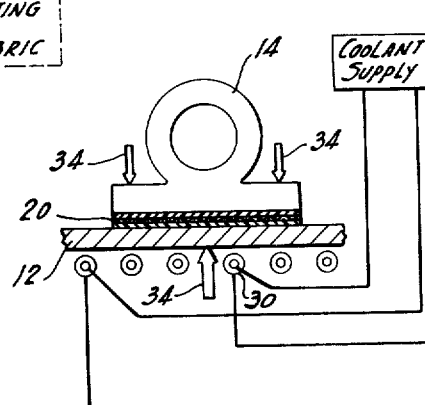

SELF-HEATING COMPOSITE BONDING MEANS AND METHOD

BACKGROUND OF THE INVENTION

1. Field of the Invention

The present invention relates to stratified structures for bonding plastic materials. 2. Description of the Prior Art In recent years, the greater understanding of structureproperty relationships of plastic materials and the introduction of new polymerization techniques and monomers have resulted in the availability of a large number of different types of plastics having a wide variety of properties. Plastic materials can be produced with the ideal properties necessary for a specific application. For instance, plastics may be hard or soft; rigid or flexible, rubbery, leathery, or glassy; porous or non porous; transparent or pigmented; thermosetting or thermoplastic, etc. These varying properties result from differences in chemical composition, atomic arrangement, molecular weight, and other structural aspects of the plastics.

In many instances, plastics having diverse properties are incorporated in a single plastic article to provide both the necessary properties and cost reduction to the article. For example, a plastic package may include a transparent rigid window portion formed of polymethyl methacrylate mounted on an opaque tough housing of reclaimed non-transparent polyvinyl chloride. The former material is transparent but expensive. The latter material is low in cost but does not offer the necessary transparent qualities. By utilizing the two different types of plastic, a low cost, windowed package is provided. In another application, it may be desired to provide fasteners on a polypropylene sheet. While the fasteners may be injection molded during the formation of the sheet, such a process leaves a dent on the side of the sheet opposite the fastener. Further, a fastener formed of polypropylene may not have the necessary mechanical strength. It is therefore preferable to affix a nylon fastener to the polypropylene sheet. In other applications, parts of an article may be porous while other parts are non porous.

While the fabrication of such articles may be accomplished by numerous, available techniques, such as the use of adhesives, mechanical fasteners, and the like, a preferable method of assembling plastic articles utilizes the thermal properties of the plastics to effect joinder. For example, the abutting portions of two plastic article portions may be heated to fusion temperature and then pressed together to effect a heat seal between the portions.

However, the differing structure and properties of the plastics often cause a greater or lesser degree of thermal bonding incompatibility between the materials which prevents formation of a satisfactory heat seal. This phenomenon has proven particularly troublesome in the fabrication of articles having portions of differing plastic materials and is proving to be an even greater impediment to fabrication as the number of diverse property and structure plastics continues to increase. Further, in cases in which a usable heat seal can be effected, this seal may be subsequently rendered ineffectual by conditions to which the articles are exposed in use, such as oxidizing or temperature conditions.

SUMMARY OF THE PRESENT INVENTION

It is, therefore, the object of the present invention to provide a means and method for thermally joining plastic or plastic coated elements exhibiting mutual bonding incompatibility.

The present invention contemplates the use of a composite bonding agent imbued with sufficient compatibility toward each of the elements to effect a thermal heat seal between the agent and each of the elements, and thus between the two elements.

It is a further object of the present invention to provide a composite bonding agent and method employing same for providing high strength joinder of diverse property and structure plastics in a rapid and inexpensive fashion.

It is a further object of the present invention to provide such a composite bonding agent which has an internal, cohesive strength exceeding that of prior art means for joining dissimilar materials.

Briefly, the aforementioned composite bonding agent comprises a stratified structure including a first material layer having bonding compatibility with the plastic of one of the elements and a second material layer having bonding compatibility with the plastic of the other element. One layer is joined to each side of the medial layer comprised of an integral stratum of strands. The joinder of the layers to the strands is accomplished by the partial or total embedment of portions of the strands lying on the surface of the stratum in the material layers.

The composite bonding agent also includes a susceptor means heatable responsive to a selected form of indirectly applied energy, typically an alternating electric or magnetic field, dispersed in at least one of the first and second material layers for heating the composite bonding agent to the heat sealing temperatures.

The composite bonding agent so formed is usable in a bonding process in which the thermally bondable plastic or plastic coated elements to be joined are juxtapositioned with the composite bonding agent between them. The composite bonding agent is positioned so that the layers are adjacent the elements with which they have bonding compatibility. The composite bonding agent is then subjected to the selected form of indirectly applied energy to heat the agent and the adjacent portions of the elements to heat sealing temperatures to affect a heat seal between the plastics of the two elements and the composite bonding agent and thus between the two elements.

A method for making the composite bonding agent having the properties, and usable in the method, described above typically includes the steps of providing a first material layer having bonding compatibility with one of the thermally bondable plastic or plastic coated elements and a second material layer having bonding compatibility with the other thermally bondable plastic or plastic coated element, dispersing the susceptor means in one or both of the material layers, and applying the layers to the fibrous stratum. This may be achieved by heating the first material layer to plasticity, impressing the fibrous stratum into an exposed surface of the first material layer, and applying the second material layer to the fibrous stratum in molten or liquid form.

BRIEF DESCRIPTION OF THE DRAWINGS

FIG. 1 is a cross sectional view of a portion of a thermoplastic article formed with the composite bonding agent and method of the present invention.

FIG. 2 is a partially cut away perspective view of the composite bonding agent of the present invention showing the various elements thereof.

FIG. 3 is an enlarged partial cross sectional view of the composite bonding agent of the present invention taken along the line 3—3 in FIG. 1

FIGS. 4a and 4b are partial cross sectional views of the thermoplastic article of FIG. 1 illustrating a method employing the composite bonding agent shown in FIGS. 2 and 3.

FIG. 5 is a block diagram illustrating the method of the present invention for manufacturing the composite bonding agent.

FIG. 6 is a partial side view of another embodiment of a method employing a composite bonding agent.

DESCRIPTION OF THE PREFERRED EMBODIMENT

In FIG. 1 there is shown a multi-piece plastic article 10. Article 10 includes a sheet 12 which, for purposes of illustration, may be assumed to be formed of polypropylene. Article 10 also includes fastener 14 shown illustratively as an eye. Fastener 14 may be formed of a high strength plastic material, for example, nylon.

Polypropylene sheet 12 and nylon fastener 14 must be joined together. Because of the differences in the structure and properties of polypropylene and nylon, a seal between the two elements having the necessary strength and other properties has been difficult to obtain in the past.

In accordance with the present invention, a composite bonding agent 20 is employed to effect the seal between sheet 12 and fastener 14. Composite bonding agent 20 is shown in greater detail in FIGS. 2 and 3. As shown therein, composite bonding agent 20 is a multi-layer or stratified structure. In the orientation shown in the Figures, a bottom layer 22 is comprised of a thermoplastic material which exhibits a high degree of bonding compatibility with the polypropylene material of sheet 12. Such compatibility may be evidenced by mutual miscibility, similarity in heat sealing temperatures, and similar properties. For example, layer 22 may be formed of polypropylene sheeting having properties similar or identical to those of the material of sheet 12.

The upper layer 24 of composite bonding agent is formed of a thermoplastic material which exhibits a high degree of bonding compatibility with the nylon of fastener 14. For example, layer 24 may be formed of a nylon material having properties similar or identical to those of the material of fastener 14.

Interposed between layers 22 and 24 is a means for providing cohesiveness to composite bonding agent 20. This means may comprise an open fabric 26 having high strength properties with respect to the materials of layers 22 and 24. Fabric 26 may typically be formed of strands 27 of glass fibers 29 or the like. Layers 22 and 24 adhere to the strands 27 by the embedment to a greater or lesser extent of the fibers and strands of fabric 26 in the layers. At certain locations, as at the crossings of the strands, strands 27 may be totally submerged in the layers so as to be encapsulated by the layers. The amount of embedment of the strands in the layers depends on many factors including the viscosity of the materials at the time of application to the fabric, the surface tension and capillary properties of the materials, the presence of wetting agents on the strands, the form in which the materials are applied to the fabric, the pressures applied to the bonding agent in manufacturing, and others. The type of fabric, the size of the interstices between the strands, the thickness of the strands with respect to the interstices, and the type of weave used to form the fabric also control the amount of embedment.

It has been found that the layers while submerging the strands at the crossing of the strands tend to remain unbonded in the interstices of fabric 26. It has been further observed that in many forms of the composite bonding agent, the layers do not penetrate completely through the fabric but rather remain spaced as shown in FIG. 3. The amount of the spacing depends on the factors noted above. In any instances, it is desirable to promote spacing of the layers so that the portions of strands 27 not in contact layers 22 and 24 are free to flex thereby to render composite bonding agent 20 pliant. Because of the flexible properties contributed by the unattached portions of the strands between the layers, flexure of the agent does not unduly stress the layer material fabric joinder thereby strengthening the composite bonding agent. In other cases it may be desired to reduce the spacing of layers 22 and 24 to a minimum or to bring layers 22 and 24 into contact in the agent to stiffen the bonding agent and to obtain additional strength from whatever bonding may occur between the layers.

If desired the strands 27 of fabric 26 may be coated with the plastics of layers 22 and 24 prior to weaving to enhance the flow of the layers around the fabric. For example, prior to weaving fabric 26, the weft may be coated with the polypropylene of layer 22, while the warp is coated with the nylon of layer 24. Fabric 26 is then woven and applied between layers 22 and 24.

One or both of layers 22 and 24 includes a particulate heat generating means susceptible to heating by a selected form of indirectly applied energy for heating composite bonding agent 20 to the heat sealing temperature. By the term "indirectly applied" it is meant that the energy responsible for inducing the heat is applied through the medium of a field, rather than being directly applied, as by physical contact with a heated platen or the like. Typically, the fields may be high frequency alternating electric or magnetic fields.

The particulate susceptor material, hereinafter called susceptor 28, is incorporated in the layer or layers in quantities sufficient to produce the desired heating action. This is typically 10 to 30 per cent by weight with respect to the materials of the layer or layers but may range from 3 percent to 50 per cent by weight. Susceptor 28 may be responsive to indirect application of energy in the form of a high frequency alternating magnetic field, in which case, susceptor 28 could consist of fine particles of a metallic oxide such as $Fe_3O_4$, $Fe_2O_3$, and $CrO_2$. Gamma $Fe_2O_3$ has been found to be particularly suitable for use in the present invention. The unique suitability of the aforesaid class of material resides in the ability of its members to retain their heat generating characteristics even when reduced to submicron size. The use of such small particles facilitates their dispersion in the material layers and does not significantly alter the other properties of the material layers, such as strength or bonding characteristics. Particle sizes as small as 0.01 microns have been used.

In cases in which the thermoplastic materials of layers 22 and 24 have disparate heat sealing temperatures, the problem of overheating the lower heat sealing temperature material may be overcome by dispersing susceptor 28 in only the higher heat sealing temperature material. In the specific example given above, the nylon material of layer 24 tends to have higher sealing temperature characteristics than the polypropylene material of layer 22 so that susceptor 28 is shown dispersed in layer 24.

To form article 10, sheet 12 and fastener 14 are juxtapositioned so that the surfaces to be sealed are in opposing relationship. Composite bonding agent 20, formed as described above, is inserted between the opposing surfaces, as shown in FIG. 4a, with layer 24 facing fastener 14 and layer 22 facing sheet 12.

The surfaces of sheet 12 and fastener 14 which are to undergo sealing are then placed in contact with composite bonding agent 20. A means for providing an alternating magnetic field is brought into proximity with the composite bonding agent. This means may typically comprise the flat spiral coil 30 shown in cross section in FIG. 4b. Coil 30 is energized by high frequency alternating current source 32. The frequency of the magnetic field produced by coil 30 may typically range between 0.4 and 6 megahertz although useful heat is achieved also at higher frequencies up to a typical maximum of 30 megahertz for a conventional coil.

Upon exposure to the high frequency alternating magnetic field provided by coil 30, susceptor 28 becomes heated, heating layer 24 and, by conduction, layer 22. The heating of these layers, in turn, results in a raising of the temperature of sheet 12 and fastener 14 to the heat sealing point. As sheet 12 and fastener 14 reach heat sealing temperature, a bond is formed between sheet 12 and layer 22 and fastener 14 and layer 24. This bond may be assisted by pressure applied in the direction of arrow 34 against the article portions.

The heating of susceptor 28 may be quite rapid, times on the order 0.1 seconds being common in instances in which both layers 22 and 24 contain susceptor 28. With the susceptor in only one of layers 22 or 24 heating times are typically somewhat longer, for example, 2 seconds. Once the desired heat seals have been obtained, the magnetic field produced by coil 30 may be removed, as by deenergizing high frequency alternating current source 32 or by physically removing the coils from proximity to composite bonding agent 20. Because of the rapid heating of susceptor 28 and the rapid formation of the necessary heat seals, sheet 12 and fastener 14 retain their body chill which assists in cooling the seal areas and completion of the heat seals. If desired, or necessary, coolant from coolant supply 36 may be circulated in the coils 30 to assist in cooling the seal areas.

In the completed joint, the bonding compatibility existing between sheet 12 and layer 22 and fastener 14 and layer 24 insures a high strength between these elements. Fabric 26 reinforces composite bonding agent 20 to lend commensurate strength to the bonding agent itself.

A method for forming composite bonding agent 20 is shown in flow diagram form in FIG. 5 commencing with the dispersing of susceptor 28 in one or both of layers 22 and 24. This dispersion may be accomplished in many ways. For example, the dry, granular layer material in pelletized form may be milled together with susceptor 28 on heated rolls. The resulting product may be sheeted thin on the rolls into the layer form.

In an alternative step, the layer material prepared as described above may be subdivided and passed through an extruder, in measured quantities with respect to additional, unloaded layer material to form the completed layer.

One of layers 22 or 24 may then be heated to a point of softening. In the event the layer containing susceptor 28 is to be heated, this may be accomplished by the use of a low intensity magnetic field applied to the layer. The layer may also be heated by laying it on a heated plate or by other means.

Fabric 26 is laid on the softened surface of the heated material layer. Fabric 26 may be precoated with the layer materials as noted above. If the fabric is formed of glass fibers, the attachment of the layermaterial may be aided by the addition of silane (aminopropyltriethoxysilane) to the glass fibers. It has also been found that the attachment of fabric 26 to the layers may be enhanced by roughening the surface of the fabric, as with sandpaper. Depending on the degree of softening, fabric 26 may partially sink into the layer by its own weight to provide the desired attachment with the layer. If the desired attachment is not thus obtained, the fabric 26 may be pressed into the layer to the necessary extent by a diffused force applied normal to the surface of the layer.

The second layer, such as layer 24, is then applied to the remaining exposed surface of fabric 26. This may be done in the same manner as the application of layer 22 or in any other convenient manner compatible with mechanical and thermal properties of the materials of the layers. Casting or extrusion coating may be employed. Coating, as by brushing, spraying, etc., may also be employed.

In connection with the polypropylene-nylon example described, supra, the composite bonding agent may be formed by heating a sheet of polypropylene and pressing the fabric into its softened surface. The nylon material may be melted and applied to the exposed surface of the fabric. The nylon material may also be applied by coating the exposed surface of the fabric with a solution of nylon in a solvent. This secures better penetration of the nylon material into the fabric but the strength of the resulting bonding agent is not quite as high as when the nylon material is melted and applied to the fabric.

The desired spacing of the layers may be controlled in numerous ways. With layer materials in the solid form, the degree of embedment of fabric 26 may be regulated by the temperature to which the layer material is heated, the amount of pressure used to push the fabric into the layer material and other processing criteria. With layer materials in the liquid form the degree of penetration may be controlled by the viscosities of the materials, the type of fabric, etc.

If the resulting composite bonding agent 20 is thicker or the spacing of the layers greater than desired, the composite may be hot pressed to a thinner and more uniform thickness. The completed composite bonding agent 20 is then cut into the desired form necessary for the bonding application, such as the rectangles shown in FIGS. 1 and 4.

To enhance the bonding of material layers 22 and 24 to the elements 12 and 14 being bonded, strands 27 should not penetrate the outer surface of composite bonding agent 20. Rather, both the outer surfaces of agent 20 should remain free of fabric 26.

It will be appreciated that numerous modifications of the above described invention may be made. The exact formulation of layers 22 and 24 may be selected to suit specific bonding applications and may comprise, but are not limited to various combinations of ABS (acrylonitrile-butadiene-styrene), acetals, acrylics, allyl resins and monomers, cellulosics, chlorinated polyethers, fluoroplastics, nylon, polycarbonates, polyesters, polyethylene, polypropylene, polyurethane, polybutylene, and vinyl polymers and copolymers.

In certain applications it may be desirable to utilize a fabric 26 formed of a plurality of unwoven parallel and overlapping strands, i.e. a roving, or a knit fabric, in lieu of a woven fabric.

One or both of layers 22 and 24 may be provided with a coloring agent, such as a particulate pigment, so as to make the composite bonding agent the same color as the article portions being joined or to distinguish the bond by its color from the article portions. Coloring of one or both of layers 22 and 24 may be used as an indication of the orientation of the layers and their compatibility properties to an operator utilizing the agent.

In certain cases it may be desirable to utilize a susceptor which is dielectrically heatable. For this purpose, a substance comprised of a material having high dielectric loss properties such as materials selected from a class consisting of the polymers and copolymers of vinyl chloride, vinyl fluoride, vinylidene chloride and vinylidene fluoride may be utilized. Polyvinyl chloride has been found to be particularly useful in this regard.

The alternating electric field necessary to generate heat in a dielectrically heatable susceptor incorporated in such a composite bonding agent may be generated between the plate like electrodes 40 energized by high frequency voltage source 42 shown in FIG. 6.

In some instances, one of the materials of layers 22 or 24 may, itself, be heatable upon exposure to indirectly applied energy, obviating the necessity of dispersing a separate susceptor in the layer material. For example, if one of the layers is formed of the halogenated vinyl or vinylidene compounds noted above the layer itself may be heated by exposure to an alternating electric field.

Various modes of carrying out the invention are contemplated as being within the scope of the following claims particularly pointing out and distinctly claiming the subject matter which is regarded as the invention.

I claim:

1. A process for thermal fusion bonding first and second thermally bondable plastic bodies formed of materials exhibiting mutual bonding incompatibility, said method comprising the steps of:

providing a composite bonding agent including first and second thermoplastic layer means having bonding compatibility with the first and second bodies, respectively, and bonding incompatibility with each other, said layer means being at least partially embedded in a medial fibrous stratum of strands for joinder thereto, at least one of said layer means having dispersed therein a particulate susceptor heatable upon exposure to a selected form of indirectly applied energy;

juxtapositioning the first and second bodies so that the portions thereof to be bonded are contiguous;

applying the bonding agent to the bodies with the first and second thermoplastic layer means adjacent the bodies with which they have bonding compatibility;

exposing the composite bonding agent to a selected form of indirectly applied energy to heat said first and second thermoplastic layer means and the adjacent portions of the bodies to heat sealing temperatures; and bringing said first and second bodies into abutment with said composite bonding agent to form thermal fusion bonds with the first and second thermoplastic layer means, respectively.

2. The process according to claim 1 wherein the first and second bodies are juxtapositioned so that the portions thereof to be bonded are opposing and the bonding agent is inserted between the bodies.

3. The method according to claim 1 further defined, as applying pressure normal to the area of thermal fusion bonding at least subsequent to exposing the composite bonding agent to the selected form of indirectly applied energy.

4. The method according to claim 1 including the terminal step of cooling the first and second bodies and the composite bonding agent to fully form the thermal fusion bond.

5. The method according to claim 1 wherein the particulate susceptor is heatable upon exposure to an alternating magnetic field and the step of exposing the composite bonding agent is further defined as exposing the bonding agent to an alternating magnetic field.

6. The method according to claim 5 further defined as subjecting the composite bonding agent to an alternating magnetic field having a frequency of from 0.4 to 30 megahertz.

7. The method according to claim 6 further defined as subjecting the composite bonding agent to an alternating magnetic field having a frequency of from 0.4 to 6 megahertz.

8. The method according to claim 1 wherein the particulate susceptor is heatable upon exposure to an alternating electric field and the step of exposing the composite bonding agent is further defined as exposing the composite bonding agent to an alternating electric field.

* * * * *